United States Patent
Masum-Thomas

(10) Patent No.: US 6,473,223 B1
(45) Date of Patent: Oct. 29, 2002

(54) RAMAN AMPLIFIER

(75) Inventor: Jowan Masum-Thomas, Halstead (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/846,916

(22) Filed: May 1, 2001

(51) Int. Cl.[7] .............................. H01S 3/00
(52) U.S. Cl. ................. 359/334; 359/341.32
(58) Field of Search .............. 359/334, 341.32

(56) References Cited

U.S. PATENT DOCUMENTS 5,497,265 A * 3/1996 Fontana et al. ............. 359/341
5,506,723 A * 4/1996 Junginger ................... 359/341
6,335,820 B1 * 1/2002 Islam ......................... 359/334

* cited by examiner

*Primary Examiner*—Mark Hellner
(74) *Attorney, Agent, or Firm*—Lee, Mann, Smith, McWilliams, Sweeney & Ohlson

(57) ABSTRACT

A Raman amplifier comprises first and second stages, in which a single pump source is used for both stages. The pump source output is coupled to one end of the second stage and unused pump power is tapped from the other end of the second stage. The unused pump power is then introduced into the first stage. The attenuation of the pump source signal in the second stage results in a lower power pump signal being applied to the first stage. The specific design of the amplifier stages enables the two pump power levels to be suitable for different fiber types so that the advantages of a multi-stage amplifier are maintained (with each stage being designed taking into account the signal powers in the different stages) whilst simplifying the pump source requirements.

12 Claims, 3 Drawing Sheets

RAMAN AMPLIFIER

FIELD OF THE INVENTION

The present invention relates to a Raman amplifier, for example for use in an optical fibre communications system.

BACKGROUND OF THE INVENTION

A Raman amplifier is a well known amplifier configuration. This amplifier uses conventional fiber (rater tan doped fibers), which may be co- or counter-pumped to provide amplification over a wavelength range which is a function of the pump wavelength. The Raman amplifier relies upon forward or backward stimulated Raman scattering. Typically, the pump source is selected to have a wavelength of around 100 nm below the wavelength over which amplification is required.

Raman amplifiers are increasingly being used to improve the overall gain characteristics of high capacity optical wavelength division multiplexed (WDM) communications systems. Raman amplifiers have the advantage that they do not attenuate signals outside the wavelength range over which amplification takes place. However, high power pump sources are required, and it may be difficult in practice to implement pump sources of the required pump wavelength and power. In addition, it is usual to provide a separate pump sources for each wavelength required, typically in the form of separate Raman fibre lasers or semiconductor plumps.

The characteristics of practical amplifiers have lead to the definition of three wavelength bands: the S band (1450 nm–1520 nm); the C band (1527 nm–1563 nm); and the L band (1570 nm–1603 nm). A 7 nm guard band is provided between the bands. Raman amplifiers are being considered as suitable for S-band amplification, which is outside the useful amplification range of more convention rare-earth doped amplifier designs, such as Erbium doped amplifiers which operate in the C-band.

Multi-stage amplifiers are also well known. Different fiber charactersistics for different amplifier stages may be desirable so that the overall gain and noise characteristics are optimised. For example, the signal power will be greatest at the output end of the amplifier, and the pump power will vary as a function of the location at which then pump signal is injected.

Various nonlinear effects are related to the power in the fiber, As a result of power-dependency of the nonlinear effects, the peaks of the optical pulses in the signal, where the optical power is largest are repeatedly phase-shifted relative to the tails of the pulses, where power is low. These are Kerr-effect phase shifts. For an optical signal of a given power, the larger the effective area, the smaller the nonlinear phase shift. Therefore, the use of a fiber having a large effective area allows carried power to be increased for a given level of non-linear distortion.

Various fiber designs exist to provide desired dispersion or loss characteristics. For example, dispersion-shifted fibers (DSF), exhibit zero-dispersion near certain convenient operating wavelengths, for example, near 1550 nm. However, these fibers typically have moderately small effective area and a slightly higher attenuation tan standard (NDSF) fiber. Although operation over long distances is possible in single channel operation, in WDM systems, non-linear cross talk limits the channel spacing or launch power. Another type of commercially available fiber, known as non-zero dispersion shifted fiber (NZDSF), also often has a mall effective area and exhibits a low to moderate dispersion over the transmission window. Other commercially available optical fibers, such as conventional single-mode (SW) fibers, have large effective areas but exhibit high dispersions near 1550 nm.

For the reasons above, it may be appropriate to use different ber types at different stages of the amplifier. Within an amplifier, where the fiber lengths are relatively short, the fibers may be selected principally in dependence on the effective areas, since this dictates to a large extent the power levels which can be tolerated. This is particularly important in Raman amplifiers where high power pump signals are used.

The need for different pumps for different wavelengths and for different pump power requirements increases the costs of such an amplifier, as large numbers of expensive optical components and long lengths of fibre are needed. Attenuating components may be used to provide different pump power outputs from a single pump source, but this reduces efficiency.

There is therefore a need for a Raman amplifier in which the pump source configuration can be simplified, whilst maintaining the advantage of tailoring the pump requirements to different amplifier stages.

SUMMARY OF THE INVENTION

According to the invention, there is provided a Raman amplifier comprising at least first and second stages with an isolator between the two stages which permits signals to be transmitted only in the direction of signal flow through the amplifier, and further comprising at least one pump source, in which:

a first coupler is provided for coupling the pump source output to one end of the second stage for pumping the second stage;

a second coupler is provided for tapping unused pump power from the other end of the second stage; and a third coupler is provided for introducing the unused pump power into the first stage.

The arrangement of the invention enables a single pump source to be used for both stages. The attenuation of the pump source signal in the second stage results in a lower power pump signal being applied to the first stage. The specific design of the amplifier stages enables the two pump power levels to be suitable for different fiber types so that the advantages of a multi-stage amplifier are maintained (with each stage being designed taking into account the signal powers in the different stages) whilst simplifying the pump source requirements.

The one end of the second stage may comprise the output end so that the second stage is counter-pumped, and the first stage may also be counter-pumped. Each stage preferably comprises a length of optical fiber, the fibers of the first and second stages being different. In particular, the fiber of the second stage may have a larger effective area than the fiber of the first section. in this way, the stage of the amplifier in which higher power signals (pump and data signals) are present has a larger effective area. This larger effective area reduces the influence of power-dependent effects such as four wave mixing. The smaller effective area fiber, which is prone to four wave mixing at high powers, has lower power signals.

The fiber of the first stage may comprise Reverse Dispersion Fiber, and the fiber of the second stage may comprise Non-Zero Dispersion Shifted Fiber. These provide suitable effective area values.

The amplifier may be for the 1480–1520 nm band (the upper part of the S-band), in which case the pump source output may have a wavelength of approximately 1413 nm and a power of approximately 1.5 W.

The fiber of the first stage may comprise Reverse Dispersion Fiber, and the fiber of the second stage comprises Dispersion Compensated Fiber. The pump source output may then have a wavelength of approxiatly 1365 nm. A second pump source may have an output with a wavelength of approximately 1386 nm, and the two pump source outputs are supplied to the second stage together. This provides a design suitable for the band 1450–1490 nm (the lower part of the S-band). The use of two pump sources may enable each to have a power of less than 1 W.

The invention also provides a wavelength division multiplex (WDM) optical conmunuications system comprising a transmitter for generating signal radiation of wavelength in an operating wavelength range, a receiver for receiving for detecting the signal radiation, and an optical fiber link between the transmitter and the receiver, wherein one or more optical amplifiers are provided in the link, at least one amplifier comprising a Raman amplifier comprising at least first and second stages with an isolator between the two stages which permits signals to be transmitted only in the direction of signal flow through the amplifier, and further comprising at least one pump source, in which:

a first coupler is provided for coupling the pump source output to the one end of the second stage for pumping the second stage;

a second coupler is provided for tapping unused pump power from the other end of the second stage; and a third coupler is provided for introducing the unused pump power into the first stage.

The invention also provides a method of amplifying optical signals, the method comprising supplying optical signals for amplification to the first stage of a multiple stage Raman amplifier, the multiple stage Raman amplifier comprising at least first and second stages with an isolator between the two stages which permits signals to be transmitted only in the direction of signal flow through the amplifier, the method comprising amplifying the signal in the first stage by providing a pump signal to the first stage, the pump signal comprising unused pump power from the second stage, and subsequently amplifying the signal in the second stage.

The characteristics of practical amplifiers have lead to the definition of three wavelength bands: the S band (1450–1520 nm); the C band (1527 nm–1563 nm); and the L band (1570 nm–1603 nm). A 7 nm guard band is provided between the bands.

BRIEF DESCRIPTION OF THE DRAWINGS

Examples of the present invention win now be described in detail with reference to the accompanying drawings, in which.

DETAILED DESCRIPTION

Where the same reference numbers have been used in different drawings, they represent the same components.

Figure 1:
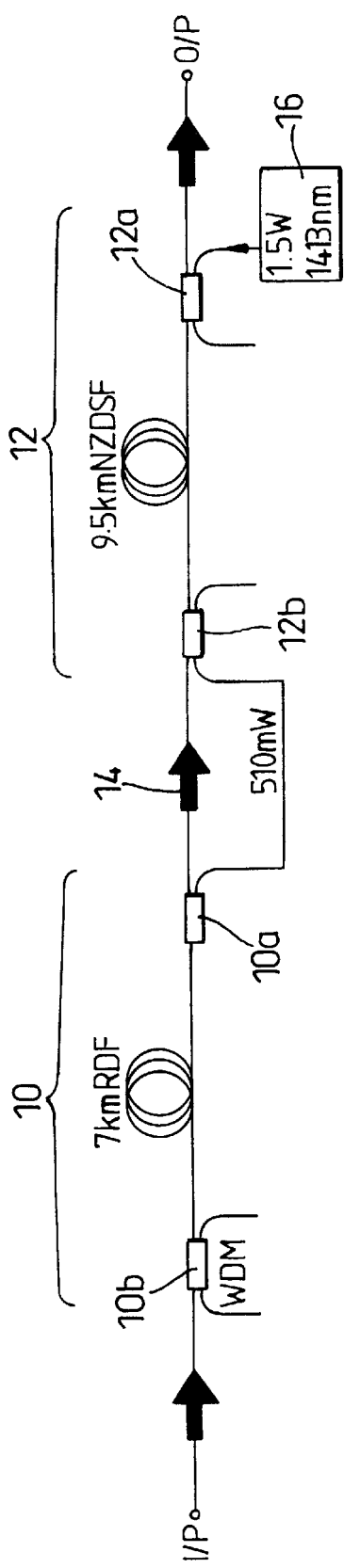
FIG. 1 shows one example of a Raman amplifier according to the present invention.

FIG. 1 shows a first example of a Raman amplifier according to the present invention. The amplifier has first and second stages 10, 12 with an isolator 14 between the two stages. The isolator permits signals to be transmitted only in the direction of signal flow through the amplifier, and thereby prevents backward propagating ASE from the second stage 12 passing into the first section 10, The two amplifier stages 10, 12, each comprise a length of fiber, stimulated by a pump signal to provide Raman amplification. In the example of FIG. 1, each amplifier stage is counter-pumped, with the pump source signal being coupled to the fiber by a respective WDM coupler 10a, 12a.

In accordance with the invention, a single pump source is provided for pumping both stages 10, 12. The pump source 16 is coupled to the second amplifier stage 12 at the coupler 12a at the output end of the second stage 12, for counter-pumping the second stage 12. The unused residual pump power at the input to the second stage 12 is tapped off by a WDM coupler 12b, and is then supplied to the coupler 10a as the pump source signal for the first stage 10. Unused pump power from the first stage 10 is tapped off at coupler 10b.

In this way, the pump power provided to the first stage 10 comprises the residual pump power from the second stage 12, and is therefore a lower intensity signal, The fibers selected for the two stages 10, 12 are selected taking into account the pump power levels. In particular, various non-linear effects are power dependent, so that different fiber designs are desirable depending upon the power levels. In particular, the fiber of the second stage may have a larger effective area than the fiber of the first section. In this way, the stage of the amplifier in which higher power signals (pump and data signals) are present has a larger effective area. This larger effective area reduces the influence of power-dependent effects such as four wave mixing. The smaller effective area fiber, which is prone to four wave mixing at high powers, has lower power signals.

The specific example of FIG. 1 is intended to provide amplification over the upper part of the S-band, for example for the 1480–1520 nm band. For this purpose, the fiber of the first stage comprises 7 km of Reverse Dispersion Fiber having an effective area of 37.4 $\mu m^2$, and the fiber of the second stage comprises 9.5 km of Non-Zero Dispersion Shifted Fiber, having an effective area of 56.2 $\mu m^2$. To provide amplification over the desired range, the pump source output has a wavelength of 1413 nm and a power of approximately 1.5 W. The specific fibers result in the pump power introduced into the first stage at the coupler 1a being of the order of 510 mW.

Figure 2:
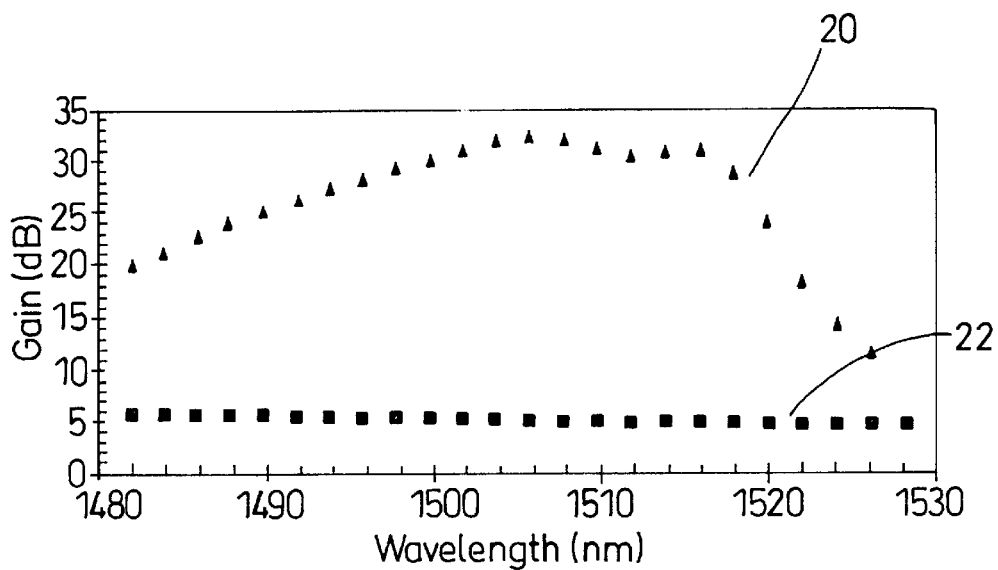
FIG. 2 shows the gain response of the amplifier of FIG. 1.

FIG. 2 shows the gain response 20 of the amplifier of FIG. 1 over the band 1480 nm to 1530 nm. FIG. 2 also shows the noise FIG. 22 for the amplifier assuming 17 channels at −10 dB/channel.

Figure 3:
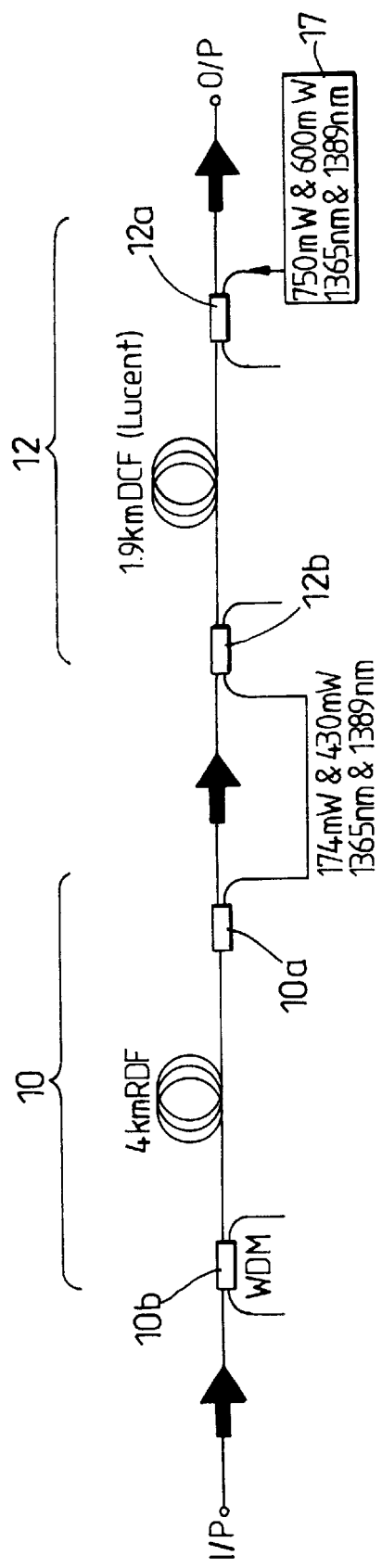
FIG. 3 shows another example of a Raman amplifier according to the present invention.

FIG. 3 shows another example of a Raman amplifier according to the present invention, in which the fiber of the first stage 10 comprises 4 km of Reverse Dispersion Fiber, of effective area 37.4 $m^2$, and the fiber of the second stage 12 comprises 1.9 km of Dispersion Compensated Fiber, of effective area approximately 30 $m^2$. The design of FIG. 3 is suitable for the lower part of the S-band, 1450–1490 nm. In the example of FIG. 3, two pump sources 17 are used, one with an output of 1365 nm at 750 mW, and the other having an output of 1389 nm at 600 mW. The two pump source outputs are supplied for counter-pumping the second stage 12 together. The use of two pump sources may enable each to have a power of less than 1 W as shown. The specific fibers result in the pump power introduced into the first stage at the coupler 10a being of the order of 430 mW at 1389 nm and 174 mW at 1365 nm.

Figure 4:
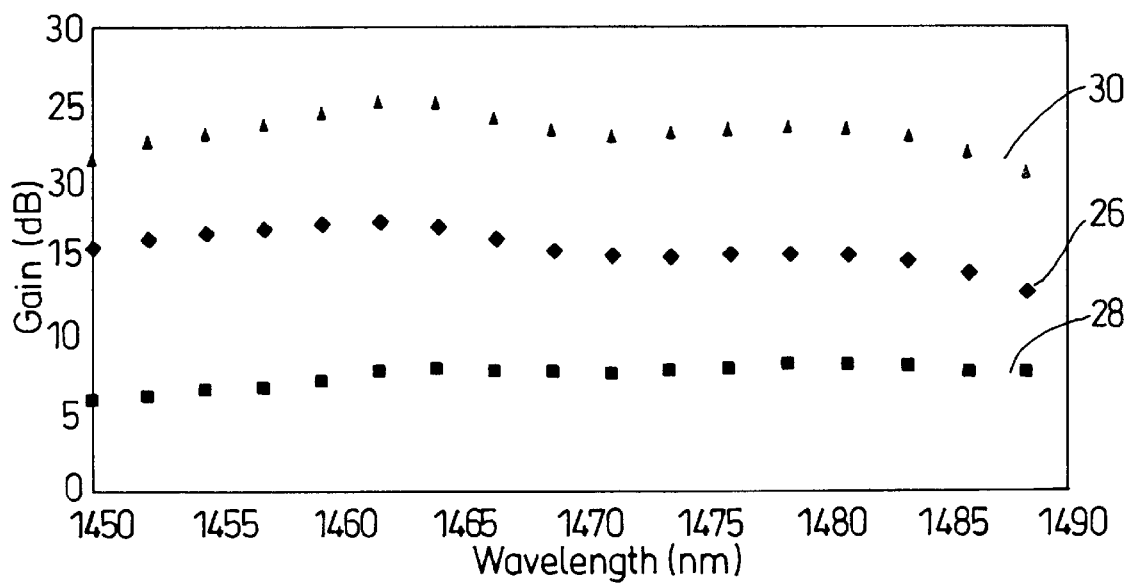
FIG. 4 shows the gain response of the amplifier of FIG. 3.

FIG. 4 shows the gain response 26 of the first stage, the gain response 28 of the second stage and the combined gain response 30 of the amplifier of FIG. 3 over the band 1450 nm to 1490 nm.

The invention enables a flat gain response to be achieved over a broad range of wavelengths, and with a simplified structure. In all examples of the invention, optical signals for amplification are supplied to a first stage of a multiple stage Raman amplifier with amplification being provided by a pump signal comprising unused pump power from the second stage. The signal is then amplified in the second stage.

Figure 5:
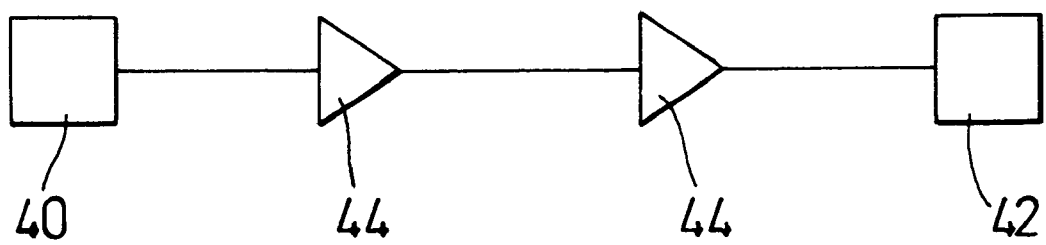
FIG. 5 shows an optical communications system using the amplifier of the invention.

The amplifier of the invention can be used in wavelength division multiplex (WDM) optical communications systems. FIG. 5 shows such a system, comprising a transmitter 40 for generating signal radiation of wavelength in an operating wavelength range, a receiver 42 for receiving the signal radiation, and an optical fiber link between the transmitter and the receiver. Optical amplifiers 44 of the invention are provided in the link. The amplifier of the invention may be used in combination with other amplifiers to provide a desired gain profile over a range of wavelengths of interest.

The specific examples described above provide amplification over different regions of the S-band. However, the invention may be applied to other wavelength ranges. The specific choices of fibers in the two examples above are also examples only, and it will be appreciated by those skilled in the art that other specific fibers may be selected in order to achieve desired gain profiles for selected wavelength ranges, The fibers will also be selected in dependence on the channel density and the channel powers.

I claim:

1. A Raman amplifier comprising at least first and second stages with an isolator between the two stages which permits signals to be transmitted only in the direction of signal flow through the amplifier, and further comprising at least one pump source, in which:
   a first coupler is provided for coupling the pump source output to one end of the second stage for pumping the second stage;
   a second coupler is provided for tapping unused pump power from the other end of the second stage; and
   a third coupler is provided for introducing the unused pump power into the first stage, wherein
   the first and second stages each comprise a fiber, with the fiber of the second stage having a larger effective area than the fiber of the first stage.

2. An amplifier as claimed in claim 1, wherein the one end of the second stage comprises the output end and the other end comprises the input end.

3. An amplifier as claimed in claim 2, wherein the third coupler is for introducing the unused pump power into the output end of the first stage.

4. An amplifier as claimed in claim 1, wherein the fiber of the first stage comprises Reverse Dispersion Fiber, and the fiber of the second stage comprises Non-Zero Dispersion Shifted Fiber.

5. An amplifier as claimed in 4, wherein the pump source output has a wavelength of approximately 1413 nm.

6. An amplifier as claimed in claim 5, wherein the pump source has a power of approximately 1.5 W.

7. An amplifier as claimed in claim 1, wherein the fiber of the first stage comprises Reverse Dispersion Fiber, and the fiber of the second stage comprises Dispersion Compensated Fiber.

8. An amplifier as claimed in claim 7, wherein the pump source output has a wavelength of approximately 1365 nm.

9. An amplifier as claimed in claim 8, further comprising a second pump source having an output with a wavelength of approximately 1386 nm, and wherein the two pump source outputs are supplied to the second stage together.

10. An amplifier as claimed in claim 9, wherein each pump source has a power of less than 1 W.

11. A wavelength division multiplex (WDM) optical communications system comprising a transmitter for generating signal radiation of wavelength in an operating wavelength range, a receiver for receiving the signal radiation, and an optical fiber link between the transmitter and the receiver, wherein one or more optical amplifiers are provided in the link, at least one amplifier comprising a Raman amplifier comprising at least first and second stages with an isolator between the two stages which permits signals to be transmitted only in the direction of signal flow through the amplifier, and further comprising at least one pump source, in which:
   a first coupler is provided for coupling the pump source output to the one end of the second stage for pumping the second stage;
   a second coupler is provided for tapping unused pump power from the other end of the second stage; and
   a third coupler is provided for introducing the unused pump power into the first stage, wherein
   the first and second stages each comprise a fiber, with the fiber of the second stage having a larger effective area than the fiber of the first stage.

12. A method of amplifying optical signals, the method comprising supplying optical signals for amplification to, the first stage of a multiple stage Raman amplifier, the multiple stage Raman amplifier comprising at least first and second optical fiber stages with an isolator between the two stages which permits signals to be transmitted only in the direction of signal flow through the amplifier, the fiber of the second stage having a larger effective area than the fiber of the first stage, the method comprising amplifying the signal in the first stage by providing a pump signal to the first stage, the pump signal comprising unused pump power from the second stage, and subsequently amplifying the signal in the second stage.

* * * * *